Oct. 29, 1968  J. J. ZYLSTRA  3,408,091

COUPLING

Filed May 23, 1966

INVENTOR
JOHN J. ZYLSTRA

BY Hofgren, Wegner, Allen,
Stellman & McCord.

ATTORNEYS 3,408,091
COUPLING
John J. Zylstra, Benton Harbor, Mich., assignor to Whirlpool Corporation, a corporation of Delaware
Filed May 23, 1966, Ser. No. 552,043
3 Claims. (Cl. 285—7)

ABSTRACT OF THE DISCLOSURE

A coupling for joining the end of a tube having a smooth outer surface such as vacuum cleaner wand tube and the end of a hose having corrugated outer and inner surfaces such as the flexible hose of a tank type vacuum cleaner in which the corrugated hose is received in a flexible body portion of the coupling having interior corrugated surface areas engaging the outer corrugated surface of the hose and a thin walled elastic and springy portion attached to and extending within the flexible body portion for stretchingly receiving the smooth outer surface of the tube with this thin wall portion being located between the tube and hose corrugated inner surface.

The invention here, as indicated above, as for joining the end of a smooth surface tube and the end of a corrugated hose such as used in a tank type vacuum cleaner. The coupling has a flexible body portion with an interior corrugated surface for receiving and retaining the outer corrugated surface of the hose and a thin walled elastic and springy portion receiving the tube so that when the corrugated hose and tube are joined by the coupling this thin wall portion is between the tube and the inner surface of the end of the corrugated hose and in the preferred structure the hose stretches the thin wall portion into sealing engagement with the inner surfaces of the corrugations of the end of the hose so that the entire assembly forms a tight seal between the outer surface of the tube, the inner surface of the end of the corrugated hose and the outer surface of this end of the corrugated suface. In a still more preferred construction the seal is made even more secure by a clamp band around the outer surface of the coupling and urging it inwardly to tighten the seal with this band having a width greater than the width between adjacent corrugations.

Other features and advantages of the invention will be apparent from the following description of one embodiment thereof taken in conjunction with the accompanying drawings.

Of the drawings

Figure 2:
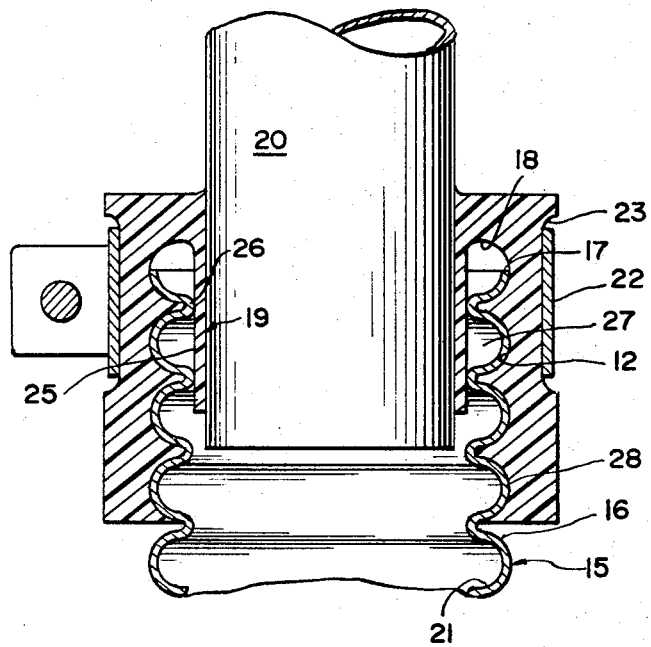
FIGURE 2 is a view similar to FIGURE 1 and illustrating the coupling of FIGURE 1 joining a rigid tube and a corrugated hose.

The coupling 10 is generally cylindrical and is flexible with a thickened body portion or wall 11. The inner surface 12 of this wall 11 is corrugated from one end 13 of the cylindrical portion 11 toward but short of the opposite end 14. This cylindrical body portion 11 is adapted to mate with and receive one end of a corrugated hose 15 as shown in FIGURE 2. The corrugated hose 15 preferably has a wall member 28 with substantially cylindrical corrugations which are annular as opposed to being helical. The corrugated inner surface 12 has corrugations shaped similarly to the outer surface 16 of the hose 15 so that the two surfaces snugly mate and engage each other to provide means for holding the coupling tightly and securely in position on the end of the hose 15. As shown in FIGURE 2, the extreme end 17 of the hose 15 terminates short of the extreme inner end 18 of the corrugated coupling surface 12. The coupling may be made of natural or synthetic rubber or other elastomers, such as, ethylene propylene terpolymer or polyurethane.

An end portion 14, provided at one end of body portion 11, overlies the corrugated coupling surface 12 and has an inner surface 29 defining an annular opening 30. As seen in FIGURE 2, the opening 30 is adapted to receive a smooth walled tubular member which may be either solid or, as shown in FIGURE 2, a hollow tube 20. The diameter of opening 30 is slightly smaller than the outer diameter of tube 20 so as to receive the tube in a sealing interference fit.

Figure 1:
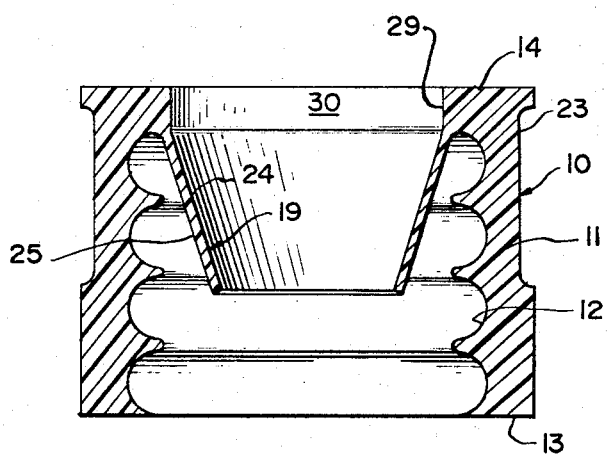
FIGURE 1 is a vertical sectional view through the longitudinal center of a coupling embodying the invention.

Extending inwardly of the end portion 14 of the coupling 10 and connected thereto is a thin walled flexible sealing portion 19 that extends in re-entrant manner into the central opening defined by the cylindrical thickened wall 11. This flexible sealing portion 19 has an inner side 24 and an outer side 25. As is shown in FIGURE 1, this thin walled flexible sealing portion 19 has the shape of a truncated cone with its base connected to the end portion 14. The inside diameter of the truncated cone at its base is slightly smaller than the outer diameter of the tube 20 so as to receive the tube in a sealing interference fit.

When the tube 20 is inserted within opening 30 of the coupling 10, as shown in FIGURE 2, the thin walled flexible sealing portion 19 stretchingly receives the tube end, and the inner side 24 of the portion 19 tightly engages the outer surface of the tube 20 to provide an effective seal therebetween. The insertion of the tube 20 into the flexible portion 19 also causes the outer side 25 of the thin walled portion 19 to tightly engage the ridges 26 of the corrugations of the inner surface 21 of the hose 15 to provide an effective seal therebetween. Thus, the thin walled portion 19 functions effectively to provide a pair of seals, that is, a first seal between the coupling 10 and tube 20 and a second seal between the hose 15 and the coupling 10.

As mentioned above, the corrugated inner surface 12 of the cylindrical portion 11 is shaped similarly to the corrugated surface 16 of the hose 15. In one embodiment, these surfaces 12 and 16 are closely dimensioned so as to provide an effective seal between the surfaces of the coupling and the hose. In such an arrangement, the hose 15 is effectively sealed by the coupling at two locations, namely, between the surface 16 of the hose 15 and the inner surface 12 of the wall 11 and between the outer side 25 of the portion 19 and ridges 26 of the inner surface 21 of the hose 15. Thus, should tolerance conditions be such that the outer side 25 of the portion 19 does not sealingly engage the ridges 26 of the hose surface 21, the coupling 10 will still be an effective seal through the engagement of corrugated surfaces 12 and 16. Under such circumstances, fluid pressure within the annular chamber 27, that is, between the thin walled portion 19 and the inner surface 26 of the hose, will function to improve the seal by pressing the thin walled portion 19 firmly against the tube 20 and by also urging the surface 16 firmly against the inner surface 12 of the coupling.

In one embodiment of the invention, the coupling alone provides a seal for internal positive pressures as high as 25±2 pounds per square inch. In the same embodiment, the coupling alone provides an effective seal when subjected to 22.5 inches of vacuum. Where higher negative or positive pressures are encountered, a band clamp 22 may be provided around the outer surface of the coupling and for this an annular recess portion 23 is provided in the outer surface of the coupling. The clamp 22 serves to compress the resilient body portion 11 and the sealing portion 19 into tight sealing engagement with cooperating surfaces on the hose 15 and tube 20, respectively.

Having described by invention as related to the embodiment shown in the accompanying drawings, it is my intention that the invention be not limited by any of the details of description, unless otherwise specified, but rather be construed broadly within its spirit and scope at set out in the accompanying claims.

The embodiments of the invention in which an exclusive property or privilege is claimed are defined as follows:

1. A coupling for joining a smooth walled tube to a corrugated hose having annular corrugations, comprising: a body portion defining an interior corrugated surface mating with and receiving said corrugated hose; an end portion connected to said body portion for receiving and encompassing said smooth walled tube; a resilient re-entrant sealing portion formed as a truncated cone having a base portion connected to said end portion having an inner diameter less than that of said smooth walled tube for receiving said tube in a sealing interference fit within the confines of said corrugated surface; and clamp means surrounding and tightly engaging said body portion for compressing said body portion and said resilient sealing portion into respective tight sealing engagement with said hose and said tube, said clamp means comprising a band clamp with an axial length greater than the corresponding axial length of said corrugated hose between adjacent corrugations whereby the resilient re-entrant sealing portion is tightly clamped between said tube and said corrugations.

2. A coupling for joining the end of a tube having a smooth outer surface and the end of a hose having corrugated outer and inner surfaces, comprising: a generally cylindrical flexible body portion having an interior corrugated surface receiving and engaging said outer corrugated surface of said hose; and a thin walled elastic and springy portion attached to and extending within said cylindrical flexible body portion stretchingly receiving said smooth outer surface of said end of said tube, said thin walled portion being located between said tube and hose corrugated inner surface and tightly engaging said inner surface by reason of said stretchingly receiving.

3. The coupling of claim 2 wherein said body portion is also elastic and springy, and said coupling comprises clamp means surrounding and tightly engaging said body portion for compressing said body portion into tight sealing engagement with said hose and tube and said thin walled portion into sealing engagement with both said tube and said corrugated inner surface.

References Cited

UNITED STATES PATENTS

| | | | |
|---|---|---|---|
| 1,984,347 | 12/1934 | Sutton et al. | 285—110 X |
| 2,631,869 | 3/1953 | Warp | 285—110 X |
| 2,755,110 | 7/1956 | Jacobs | 285—331 |
| 3,167,330 | 1/1965 | Draudt | 285—174 X |

FOREIGN PATENTS

Ad. 86 1/1898 Great Britain.

CARL W. TOMLIN, *Primary Examiner.*

THOMAS F. CALLAGHAN, *Assistant Examiner.*